Figure 1:
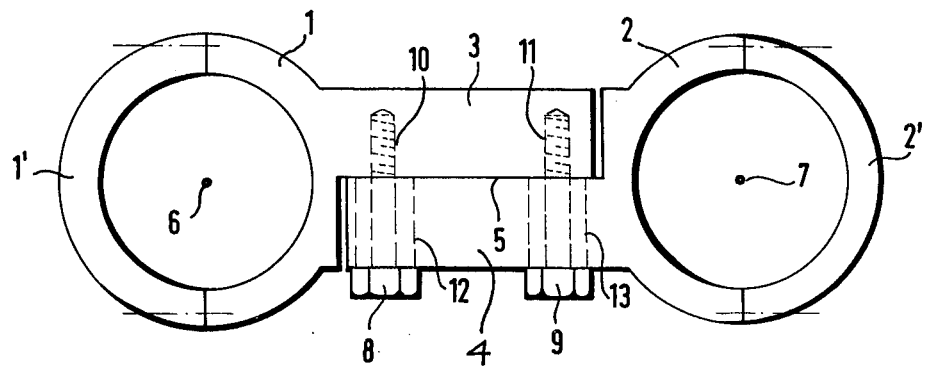

United States Patent

Weigl

[11] Patent Number: 4,479,661
[45] Date of Patent: Oct. 30, 1984

[54] FORK BAR FOR MOTORCYCLES

[76] Inventor: Richard Weigl, Schrobenhausener Str. 56, D-8897 Pöttmes, Fed. Rep. of Germany

[21] Appl. No.: 395,285

[22] Filed: Jul. 6, 1982

[30] Foreign Application Priority Data

Jul. 10, 1981 [DE] Fed. Rep. of Germany ... 8120152[U]

[51] Int. Cl.³ .............................................. B62K 25/08
[52] U.S. Cl. .................................... 280/279; 248/513; 248/54 D; 403/389
[58] Field of Search ................ 280/279, 280; 403/385, 403/389, 390, 391; 248/513, 514, 540

[56] References Cited

U.S. PATENT DOCUMENTS 1,004,574 10/1911 Jones ..................................... 403/391
3,643,974 2/1972 Peate ................................... 280/279

FOREIGN PATENT DOCUMENTS 7932413 2/1980 Fed. Rep. of Germany .
594274 11/1947 United Kingdom ................ 403/391

Primary Examiner—Joseph F. Peters, Jr.
Assistant Examiner—Kenneth R. Rice
Attorney, Agent, or Firm—Edward E. Pascal

[57] ABSTRACT

A fork bar for motorcycles with two clamps surrounding the fork halves of the front wheel fork, which are connected to one another by two bar parts running essentially parallel to each other. The two bar parts are rigidly connected with one clamp each. The bar parts contact one another along a surface and are connected to one another by means of at least one connecting bolt running at right angles to this surface which is led through a through-hole running at right angles, on one of the bar parts. The through-hole has a larger diameter than the shaft of the connecting bolt.

13 Claims, 3 Drawing Figures

FORK BAR FOR MOTORCYCLES

The invention relates to a fork bar, which can subsequently be attached to the motorcycle, with two clamps surrounding the fork halves of the front wheel fork, which are connected to one another by way of two bar parts running essentially parallel to each other.

The front wheel fork of motorcycles consists of two fork halves, which support the front wheel between them at their bottom. In order to cushion the front wheel, the fork halves can be constructed as telescopic springs. At the top, the two fork halves are rigidly connected to one another by way of a forkhead. At the forkhead, a fork shaft, running upward, is fastened, which is pivoted about an approximately vertical axle on the motorcycle frame. The handle bar is fastened on the upper end of the fork shaft.

The two fork halves are thus connected to one another by the forkhead at the top and, at the bottom, by the front wheel axle. Hereby, the forkhead and axle run parallel to one another.

If the motorcycle rounds a curve, then both fork halves can twist, that is, bend, whereby the front wheel axle no longer runs parallel to the forkhead and thus to the handle bar. As a result, the steering stability of the motorcycle is affected and falls can occur when rounding curves. In order to improve the steering stability, therefore, a fork bar is provided which connects both fork halves below the forkhead and directly above the front wheel.

With a fork bar, as disclosed in German Industrial Design No. 79 32 413, the two clamps are connected to one another by way of two connecting bolts running parallel at a distance from one another. Each of the clamps is divided. The screws connecting the two clamp parts to one another also connect the clamps with the connecting bolt. It is disadvantageous that this fork bar is not twist resistant and thus does not fulfil its purpose. Since the fork halves of the front wheel fork do not always have a constant distance to one another, it is necessary to alter the distance between the two clamps. With the prior art fork bar, only one increase of this distance is possible by inserting spacer washers between the clamps and the connecting bolts. Moreover, it appears that the fork halves of the front wheel fork do not always run parallel to one another. If this defect is present, the use of a fork bar causes the occurrence of stresses in the front wheel fork, which can lead to its deformation or breaking.

A principal object of the present invention is to construct the fork bar in such a way that the distance between the clamps is adjustable and, at the same time, that the fork bar is twist resistant in spite of this adjustability. In a further embodiment, the object is to construct the fork bar in such a way that deviations in the parallel axle course of the fork halves of the front wheel fork can be adjusted.

These objects are obtained by providing a fork bar for motorcycles with two clamps surrounding the fork halves of the front wheel fork, which are connected to one another by two bar parts running essentially parallel to each other. The two bar parts are rigidly connected with one clamp each. The bar parts contact one another along a surface and are connected to one another by means of at least one connecting bolt running at right angles to this surface which is led through a through-hole running at right angles, on one of the bar parts. The through-hole has a larger diameter than the shaft of the connecting bolt.

Figure 2:
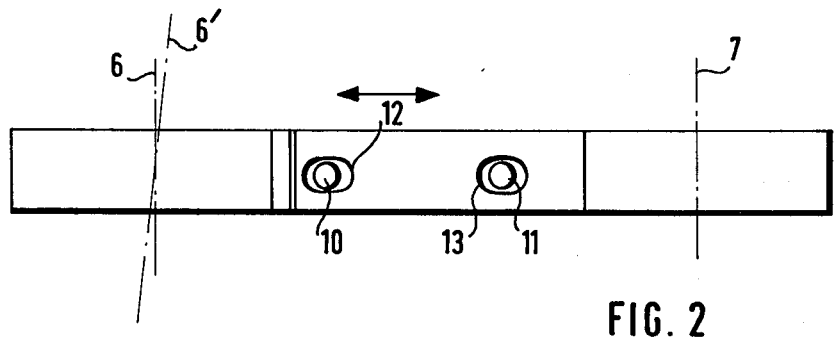
Figure 3:
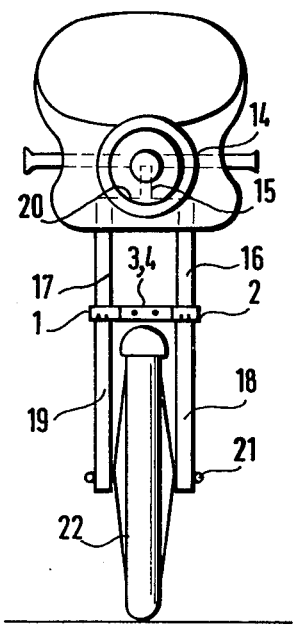

An embodiment of the invention is illustrated in the drawing, showing:

FIG. 1—a top view;
FIG. 2—a side view of the fork bar;
FIG. 3—a front view of a motorcycle with the fork bar.

The two divided clamps 1, 2 surround, when installed, one fork half each, 17, 19 and 16, 18, of the front wheel fork of a motorcycle. Each of the outer clamp part portions 1' and 2' are connected with the inner clamp parts by screws, whose axes are indicated in FIG. 1. Bar part 3 is one piece with clamp 1. A bar part 4 is one piece with clamp 2. The two bar parts 3, 4 contact each other along a surface 5, which is determined by the connecting plane between the two axes 6, 7 of the clamps 1, 2. Each bar part 3, 4, therefore, has an L-shaped cut in which the other bar part is set. In an ideal condition, the axes 6, 7 of the clamps would be congruent with the axes of the fork halves 17, 19 and 16, 18.

The two bar parts 3, 4 are connected to one another by screw bolts 8, 9. These screw bolts 8, 9 run at right angles to the surface 5. The screw bolts 8, 9 are screwed into tapped holes 10, 11 of the bar part 3 and led through through-holes 12, 13 of the bar part 4. The through-holes 12, 13 have a larger diameter than the diameters of the shafts of the screw bolts 8, 9. In the illustrated embodiment of the invention, the through-holes 12, 13 refer to oblong holes which run in direction of the bar parts 3, 4. As a result of the through-holes 12, 13, made as oblong holes, it is possible to adapt the mutual distance of the clamps 1, 2 to the actual distance between the fork halves 17, 19 and 16, 18 of the front wheel fork, which is indicated by the arrow in FIG. 2. Since a distance in the direction of the axes 6, 7 also prevails between the shafts of the screw bolts 8, 9 and the through-holes 12, 13, it is possible, with a non-parallel course of the fork halves 17, 19 and 16, 18, to tilt the axes 6, 7 against one another, as is indicated by the axial position 6' of clamp 1.

During assembly, the one clamp 1 is screwed to the one fork half 17, 19 and the other clamp 2 to the other fork half 16, 18. Subsequently, the two screw bolts 8, 9 are screwed into the tapped holes 10, 11 and tightened. The two fork halves 17, 19 and 16, 18 are then firmly connected to one another. The clamps 1, 2 take a position with respect to one another which corresponds exactly to the mutual distance of the two fork halves 17, 19 and 16, 18 and their course relative to one another, even if these do not run exactly parallel to one another. In this way, it is ensured that the fork bar does not produce any stress whatsoever in the front wheel fork.

In FIG. 3, the conditions after installation are illustrated.

The one fork half 17, 19 and the other fork half 16, 18 are connected to one another at the top by the forkhead 20 and at the bottom by the front wheel axle 21, which supports the front wheel 22. On the fork shaft 15, which is connected to the forkhead 20, the handle bar 14 is fastened.

The fork bar braces the square formed by the fork halves 17, 19 and 16, 18 as well as the forkhead 20 and the axle 21, thus forming two bend resistant squares, the first square consisting of the forkhead 20, sections 16, 17 and the fork bar and the second square consisting of the fork bar, sections 18, 19 and the axle 21.

If the fork halves 17, 19 and 16, 18 exhibit a distance, conditional on the method of production, which does not exactly correspond to the desired distance and/or if the two fork halves, also conditional on the method of production, do not run exactly parallel to one another, then no mechanical stresses are produced in the front wheel fork by attachment of the fork bar as a result of the large tolerances between the shafts of the screw bolts 8, 9 and the through-holes 12, 13.

According to a variation of this embodiment, the bar part 3 can also have two through-holes corresponding to the through-holes 12, 13. In this case, the ends of the two connecting bolts 8, 9 project beyond the bar part 3 and are each screwed there with nuts.

What is claimed is:

1. A fork bar for motorcycles comprising:
   (a) a pair of independently clamped clamps for surrounding corresponding fork halves of the motorcycle,
   (b) a crossbrace,
   (c) laterally adjustable means for rigidly locking the crossbrace to the clamps, whereby varying distances between the fork halves of different motorcycles can be rigidly bridged by the same crossbrace.

2. A fork bar as defined in claim 1 in which the means for blocking the crossbrace is comprised of oversized or elongated holes having axes at right angles to the axis of the crossbrace located in either of the clamps or crossbrace, bolts for passing through the oversized or elongated holes, and means for fastening the bolts to the other of the clamps or crossbrace.

3. A fork bar as defined in claim 1, in which the crossbrace is comprised of a pair of bar parts extending substantially parallel to, and contacting each other along a surface, each rigidly connected to a corresponding clamp, one of the bar parts having at least one through hole running at right angles to said surface, the bar parts being connected to one another by means of at least one connecting bolt running at right angles to said surface through said at least one through hole, the through hole having a larger diameter than the shaft of the connecting bolt.

4. A fork bar as defined in claim 3, in which the length of each bar part is less than the distance between the clamps when the connecting bolt or bolts are located along the axes of the through hole or through holes.

5. A fork bar as defined in claim 3, in which the length of each bar part is less than the distance between the clamps whereby gaps are provided between the ends of the bar parts and the opposite clamps.

6. A fork bar according to claim 5, in which the surface runs in the direction of the clamp axis.

7. A fork bar according to claim 5, in which the connecting bolt is screwed in one bar part and passes through a through-hole in the other bar part whose diameter is larger than the shaft diameter of the connecting bolt.

8. A fork bar according to claim 7, in which the through-hole is an oblong hole which has its oblong direction running parallel to the direction of the axes of the bar parts.

9. A fork bar according to claim 5, in which two connecting bolts and two through-holes are provided.

10. A fork bar according to claim 5, in which each bar part has an L-shaped cut to accommodate the other bar part, the long sides of the L-shaped cuts forming the surface.

11. A fork bar according to claim 5, in which the other bar part also has a through-hole through which the connecting bolt is led, the latter through-hole also having a larger diameter than the shaft of the connecting bolt, whereby the connecting bolt can be fastened with a nut.

12. A fork bar according to claim 11, in which two connecting bolts and, on the bar parts, two through-holes each are provided.

13. A fork bar as defined in claim 5 in which each of the clamps is comprised of an inner shell portion connected to a bar part for surrounding inner portions of the fork halves and an outer shell portion for connection to an inner shell portion, for surrounding outer portions of the fork halves and clamping the fork halves between the shell portions.

* * * * *